United States Patent Office 2,700,616
Patented Jan. 25, 1955

2,700,616
ACYLATED LACTAMIDES

Martin L. Fein, Riverside, N. J., William P. Ratchford and Edward M. Filachione, Philadelphia, Pa., and Charles H. Fisher, New Orleans, La., assignors to the United States of America as represented by the Secretary of Agriculture No Drawing. Application November 9, 1951,
Serial No. 255,724

8 Claims. (Cl. 106—181)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to acylated lactamides corresponding to one of the general formulae:

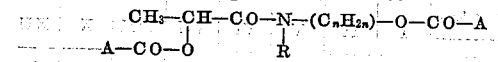

and

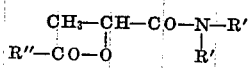

wherein —($C_nH_{2n}$)— is a divalent, aliphatic, saturated acyclic hydrocarbon radical, $n$ being an integer from 2 to 4; A is an alkyl group having not more than 11 carbon atoms; R is hydrogen or the grouping —($C_nH_{2n}$)—O—CO—A wherein —($_nH_{2n}$)—, $n$, and A have the same significance as above; R' is a benzyl group or an alkyl group having from 4 to 12 carbon atoms; R" is an alkyl group having not more than 11 carbon atoms, or an alkoxy group having from 4 to 12 carbon atoms, or the grouping

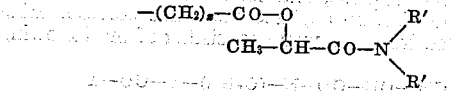

wherein R' has the same significance as above and $x$ is an integer from 1 to 8, and wherein each A appearing in the first mentioned formula is identical to all other A's in that formula and each R' appearing in the second mentioned formula is identical to all other R's in that formula.

Compounds corresponding to the aforesaid general formulae are obtained on reacting the corresponding lactamide containing at least one free hydroxyl group with an acylating agent such as an anhydride or acyl chloride of an aliphatic saturated mono- or dicarboxylic acid. Thus, such acylated lactamides wherein R is hydrogen are obtained by reacting an N-hydroxyalkyl lactamide, like N-2-hydroxyethyl, N-2-hydroxypropyl, N-3-hydroxybutyl, N-2-methyl-2-hydroxypropyl, or N-1,1-dimethyl-2-hydroxyethyl lactamide, with an acylating agent containing the acyl radical of acetic, propionic, butyric, heptanoic, 2-ethyl hexanoic or of any other aliphatic, saturated, monocarboxylic acid having from 2 to 12 carbon atoms. Acylated lactamides wherein R is —($C_nH_{2n}$)—O—CO—A are obtained in an analogous manner from the corresponding N,N-bis (hydroxyalkyl) lactamides.

Acylated lactamides wherein R" is an alkyl group and R' is a benzyl or an alkyl group are obtained by reacting the acylating agent containing the acyl radical of an aliphatic saturated, monocarboxylic acid having from 2 to 12 carbon atoms, with N,N-di-benzyl or N,N-dialkyl lactamide, respectively. Acylated lactamides wherein R' is benzyl or an alkyl group and R" is an alkoxy group are obtained by reacting a N,N-dibenzyl or N,N-dialkyl lactamide, respectively, with an alkyl chlorocarbonate, such as butyl, amyl, hexyl, dodecyl chlorocarbonate, or any other chlorocarbonate containing from 4 to 12 carbon atoms in the alkyl group. Acylated lactamides where R' is benzyl or alkyl and R" is the grouping

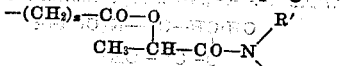

are obtained by reacting the N,N-dibenzyl or N,N-dialkyl lactamide, respectively, with the chloride of malonic, succinic, glutaric, adipic, pimelic, subaric, azelaic, or sebacic acid.

The acylated lactamides of this invention possess properties which render them useful as modifiers or plasticizing agents for synthetic plastics and compositions containing them.

The following examples illustrate the invention:

*Example I.—N,N-bis-(2-hydroxyethyl) lactamide tripropionate*

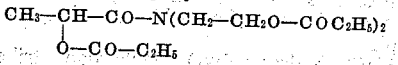

One-half mole of N,N-bis(2-hydroxyethyl) lactamide was weighed into a 500 ml. round bottom flask fitted with a condenser and thermometer. The flask was heated on a steam bath and one and one-half moles of propionic anhydride containing one ml. of concentrated sulfuric acid was gradually added. The reaction mixture was then heated on the steam bath for approximately 4 hours. Anhydrous sodium acetate was then added to neutralize the acid catalyst and the reaction mixture was then fractionated under reduced pressure. N,N-bis-(2 hydroxyethyl) lactamide tripropionate ($n_d^{20}$ 1.4602; $d_4^{20}$ 1.1291) was collected at 132–140° C./0.01 mm.

*Example II.—N,N-dibutyllactamide adipate*

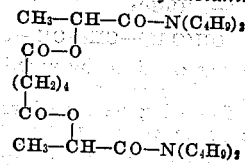

A one-liter, three-neck, round bottom flask, containing one mole N,N-dibutyllactamide, 85 g. of dry pyridine and 100 ml. of ether was fitted with a stirrer, thermometer and dropping funnel containing one half mole of adipyl chloride. The adipyl chloride was then added to the contents of the flask, slowly and with constant stirring, while maintaining the temperature below 20° C. by cooling in an ice-water bath. Upon completion of the exothermic reaction the mixture was stirred at room temperature until the amount of pyridine hydrochloride which separated from the solution ceased to increase, and approximately 100 ml. of water was then added to dissolve the pyridine hydrochloride precipitate. The contents of the flask were transferred to a separatory funnel, the ether layer was separated, washed neutral with dilute sodium bicarbonate solution and water, and dried. After distilling the ether the residue was fractionated under reduced pressure. N,N-dibutyllactamide adipate ($n_d^{20}$ 1.4705; $d_4^{20}$ 1.0201) was collected at 180–187° C./0.005 mm.

*Example III.—N,N-bis(2hydroxyethyl) lactamide triacetate*

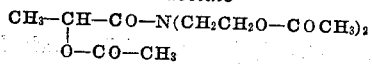

One-half mole of N,N-bis(2-hydroxyethyl) lactamide was reacted with one and one-half mole of acetic anhydride containing one ml. of concentrated sulfuric acid as a catalyst, as described in Example I.

N,N-bis(2-hydroxyethyl) lactamide triacetate ($n_d^{20}$ 1.4638; $d_4^{20}$ 1.1806) was collected at 121–127° C./0.01 mm.

*Example IV.—N,N-dibenzyl lactamide acetate*

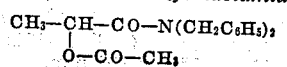

One-half mole of N,N-dibenzyl lactamide was reacted, essentially as described in Example I, with an equimolecular amount of acetic anhydride using 1 g. of acetyl chloride as a catalyst.

N,N-dibenzyl lactamide acetate ($n_d^{20}$ 1.5527) was collected at 120–128° C./0.003 mm.

*Example V.—N,N-didecyl lactamide acetate*

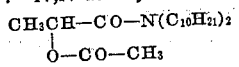

This compound was prepared by the procedure of the foregoing example from equimolecular amounts of N,N-didecyl lactamide and acetic anhydride. N,N-didecyl lactamide acetate ($N_d^{20}$ 1.4577; $d_4^{20}$ 0.9086) was collected at 132° C./0.005 mm.

*Example VI.—N,N-bis(2-hydroxyethyl) lactamide triheptanoate*

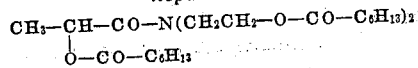

One mole of N,N-bis-(2-hydroxyethyl) lactamide was reacted in ether solution and in the presence of pyridine with 3 moles of heptanoyl chloride essentially as described in Example II.

N,N-bis(2-hydroxyethyl) lactamide triheptanoate ($n_d^{20}$ 1.4593; $d_4^{20}$ 1.0024) was collected at 193° C./0.02 mm.

*Example VII.—N,N-dibutyl lactamide laurate*

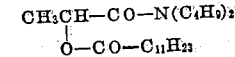

This compound was prepared by the procedure of Example II from equimolecular amounts of N,N-dibutyl lactamide and lauroyl chloride.

N,N-dibutyl lactamide laurate ($n_d^{20}$ 1.4558; $d_4^{20}$ 0.9154) was collected at 132° C./0.003 mm.

*Example VIII.—N,N-dibutyl lactamide 2-ethyl hexanoate*

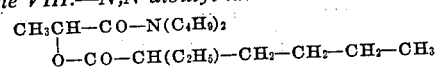

This compound was obtained by reacting N,N-dibutyl lactamide with an equimolecular amount of 2-ethyl hexanoic acid chloride following the procedure of Example II.

N,N-dibutyl lactamide 2-ethyl hexanoate ($n_d^{20}$ 1.4526; $d_4^{20}$ 0.9280) was collected at 146° C./1.1 mm.

*Example IX.—N,N-di-2-ethyl hexyl lactamide 2-ethyl hexanoate*

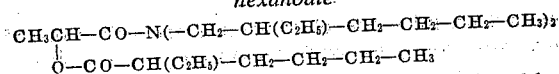

Equimolecular proportions of N,N-di-2-ethyl hexyl lactamide and 2-ethyl hexanoyl chloride were reacted in accordance with the procedure of Example II.

N,N-di-2-ethyl hexyl lactamide 2-ethyl hexanoate ($n_d^{20}$ 1.4590; $d_4^{20}$ 0.9122) was collected at 119–124° C./0.03 mm.

*Example X.—N,N-di-n-octyl lactamide n-amyl carbonate*

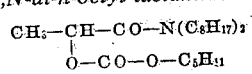

This compound was obtained on reacting equimolecular amounts of di-n-octyl lactamide and n-amyl chlorocarbonate, using the procedure of Example II.

N,N-di-n-octyl lactamide n-amyl carbonate ($n_d^{20}$ 1.4558; $d_4^{20}$ 0.9339) was collected at 130–132° C./0.01 mm.

*Example XI.—N-2-hydroxypropyl lactamide di-2-ethyl hexanoate*

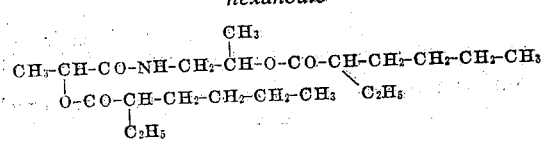

N-2-hydroxypropyl lactamide was reacted with two molecular equivalents of 2-ethyl hexanoyl chloride, essentially as described in Example II. N-2-hydroxypropyl lactamide di-2-ethyl hexanoate ($n_d^{20}$ 1.4532; $d_4^{20}$ 0.9747) was collected at 124–127° C./0.02 mm.

*Example XII.—N-2-hydroxyethyl lactamide di-2-ethyl hexanoate*

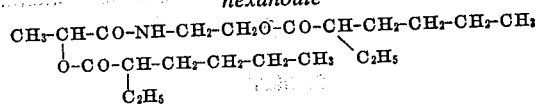

N-2-hydroxyethyl lactamide was reacted with 2 molecular equivalents of 2-ethylhexanoyl chloride, essentially as described in Example II.

N-2-hydroxyethyl lactamide di-2-ethyl hexanoate ($n_d^{20}$ 1.4549; $d_4^{20}$ 0.9852) was collected at 133° C./<0.001 mm.

The acylated lactamides of Examples I, II, and IV–XII are compatible with ethyl cellulose, and those of Examples I–IV with cellulose acetate. Films cast from solutions containing these synthetic resins and the acylated lactamide in a weight ratio of 1:0.33, were clear, dry, tough, and flexible.

The products of Examples I, II, V–VIII, X, and XII are suitable plasticizers for vinyl chloride-acetate copolymer (95% chloride–5% acetate) as evaluated by a method essentially similar to that of Kent and Weaver, 1947, India Rubber World, 115, 813–816. The characteristics of the molded samples so obtained are shown in the following table:

PLASTICIZER

| Compound of Example | I | II | V | VI | VII | VIII | X | XII |
|---|---|---|---|---|---|---|---|---|
| Characteristics of plasticized material: | | | | | | | | |
| Tensile strength, p. s. i. | 3,360 | 3,410 | 3,040 | 3,290 | 2,740 | 3,140 | 3,020 | 3,170 |
| Ultimate elongation, percent | 290 | 330 | 400 | 365 | 350 | 310 | 360 | 370 |
| 100% modulus, p. s. i. | 1,290 | 1,790 | 1,340 | 1,400 | 1,130 | 1,290 | 1,390 | 1,620 |
| Brittle point, ° C. | −16 | +3 | −34 | −26 | −49 | −30 | −28 | −31 |

We claim:
1. A composition comprising a synthetic resin selected from the group consisting of a vinyl chloride-acetate copolymer, ethyl cellulose, and cellulose acetate and, as a plasticizer therefor, an acylated lactamide corresponding to one selected from the group consisting of the following formulae:

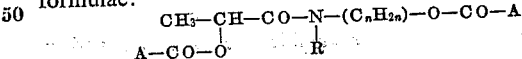

and

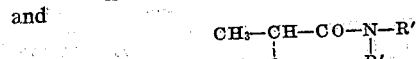

wherein —($C_nH_{2n}$)— is a divalent, aliphatic, saturated acyclic hydrocarbon radical, n being an integer from 2 to 4; A is an alkyl group having not more than 11 carbon atoms; R is a member selected from the group consisting of hydrogen and the grouping

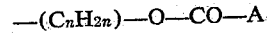

wherein —($C_nH_{2n}$)—, n and A have the same significance as above; R' is a member selected from the group consisting of a benzyl group and an alkyl group having from 4 to 12 carbon atoms; R'' is a member selected from the group consisting of an alkyl group having not more than 11 carbon atoms, an alkoxy group having from 4 to 12 carbon atoms, and the grouping

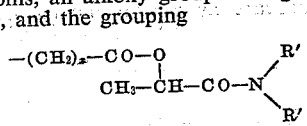

wherein R' has the same significance as above and x is an integer from 1 to 8, and wherein each A appearing in the first mentioned formula is identical to each other A in that formula and each R' appearing in the second mentioned formula is identical to each other R' in that formula.

2. The composition of claim 1 wherein the synthetic resin is a vinyl chloride-acetate copolymer.

3. The composition of claim 1 wherein the synthetic resin is a vinyl chloride-acetate copolymer and the plasticizer therefor is N,N-bis(2-hydroxyethyl) lactamide tripropionate.

4. The composition of claim 1 wherein the synthetic resin is a vinyl chloride-acetate copolymer and the plasticizer therefor is N,N-dibutyllactamide adipate.

5. The composition of claim 1 wherein the synthetic resin is a vinyl chloride-acetate copolymer and the plasticizer therefor is N,N-di-n-octyl lactamide n-amyl carbonate.

6. The composition of claim 1 wherein the synthetic resin is a vinyl chloride-acetate copolymer and the plasticizer therefor is N-2-hydroxyethyl lactamide di-2-ethyl hexanoate.

7. The composition of claim 1 wherein the synthetic resin is cellulose acetate.

8. The composition of claim 1 wherein the synthetic resin is cellulose acetate and the plasticizer therefor is N,N-dibenzyl lactamide acetate.

References Cited in the file of this patent

UNITED STATES PATENTS

| | | |
|---|---|---|
| 2,170,845 | Woodhouse | Aug. 29, 1939 |
| 2,290,881 | Katzman | July 28, 1942 |
| 2,399,479 | Emerson | Apr. 30, 1946 |
| 2,415,356 | Kellogg et al. | Feb. 4, 1947 |
| 2,531,406 | D'Alelio | Nov. 28, 1950 |

OTHER REFERENCES

Ratchford, Ind. Engineering Chemistry 42, 1565-7 (1950).

Ratchford, J. Amer. Chem. Soc. 71, 647-51 (1949).